United States Patent
Dorsey et al.

(10) Patent No.: US 8,606,703 B1
(45) Date of Patent: Dec. 10, 2013

(54) METHOD FOR TRANSFERRING MONEY USING EMAIL

(71) Applicant: Square, Inc., San Francisco, CA (US)

(72) Inventors: Jack Dorsey, San Francisco, CA (US); Robert Andersen, San Francisco, CA (US); Bob Lee, San Francisco, CA (US); Brian Grassadonia, San Francisco, CA (US); David M. Byttow, San Francisco, CA (US); Austin Broyles, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 13/839,623

(22) Filed: Mar. 15, 2013

(51) Int. Cl.
*G06Q 40/00* (2012.01)

(52) U.S. Cl.
USPC .................................. 705/39; 705/40; 705/42

(58) Field of Classification Search
USPC ..................................................... 705/39, 40
See application file for complete search history.

(56) References Cited

U.S. PATENT DOCUMENTS

| | | | | |
|---|---|---|---|---|
| 7,194,437 | B1 * | 3/2007 | Britto et al. ..................... | 705/40 |
| 7,376,587 | B1 * | 5/2008 | Neofytides et al. ......... | 705/26.35 |
| 7,587,342 | B2 * | 9/2009 | Neofytides et al. ......... | 705/26.44 |
| 7,606,734 | B2 * | 10/2009 | Baig et al. .................. | 705/26.35 |
| 7,610,222 | B2 * | 10/2009 | Neofytides et al. ......... | 705/26.42 |
| 8,447,693 | B2 * | 5/2013 | Lynch et al. .................... | 705/43 |
| 2011/0313921 | A1 * | 12/2011 | Dheer et al. .................... | 705/42 |

OTHER PUBLICATIONS

Penrose, Paul; Email Payment Challenges Banks, Banking Technology, Mar. 2000.*
Electronic Funds Corporation. Introduction to ACH Processing—"Processing Your Funds at the Speed of Light". Publication date unknown. Accessed Mar. 25, 2013. Retrieved from the Internet: URL<http://www.achnetwork.com/introtoach.html>. 1 Page.
Lomas, Natasha. *Amex Launches Pay by Tweet, Turns Purchases Into Adverts*. Tech Crunch. Published Feb. 12, 2013. Accessed Mar. 25, 2013. Retrieved from the Internet: URL< http://techcrunch.com/2013/02/12/amex-pay-by-tweet/>. 6 Pages.
Kim, Ryan. *Chirpify Turns Twitter Into a Payment and Commerce Platform*. Gigaom. Published Feb. 15, 2012. Accessed Mar. 25, 2013. Retrieved from the Internet: URL<http://gigaom.com/2012/02/15/chirpify-turns-twitter-into-a-payment-and-commerce-platform>. 4 Pages.
Chirpify.com. Homepage. Publication date unknown. Accessed Mar. 25, 2013. Retrieved from the Internet: URL< https://chirpify.com>. 13 Pages.
Interac e-TRANSFER. Interac. Publication date unknown. Accessed Mar. 25, 2013. Retrieved from the Internet: URL< http://www.interac.ca/index.php/en/interac-etransfer/etransfer-detail>. 3 pages.
Geffner, Marcie. *Swipe! How Do Debit Cards Work?* Bankrate.com. Published Dec. 12, 2012. Accessed Mar. 25, 2013. Retrieved from the Internet: URL<http://www.bankrate.com/finance/banking/how-do-debit-cards-work.aspx>. X Page.

* cited by examiner

*Primary Examiner* — Jagdish Patel
(74) *Attorney, Agent, or Firm* — Fish & Richardson P.C.

(57) ABSTRACT

Method, systems, and apparatus for receiving the email message from a sender device; identifying, using data processing apparatus of a payment service system, a sender email address, a service email address, and one or more recipient email addresses from the email message; identifying, for the sender email address, a sender financial account associated with the payment service system and, for each of the one or more recipient email addresses, a respective recipient financial account associated with the payment service system; identifying a payment amount from a subject or body of the email message; submitting a request to transfer, using the payment service system, the payment amount from the respective sender financial account to the respective recipient financial account.

22 Claims, 8 Drawing Sheets

| | |
|---|---|
| To: | susan@mail.com ⌒ 302 |
| From: | pay@square.com ⌒ 306 |
| Subject: | jon@mail.com has sent you $5! ⌒ 314 | jon@mail.com has successfully sent you $5 for "Lunch on Tuesday". ⌒ 316

312

| | |
|---|---|
| To: | susan@mail.com ⌒ 302 |
| From: | jon@mail.com ⌒ 304 |
| CC: | pay@square.com ⌒ 306 |
| Subject: | $5 ⌒ 308 |

Lunch on Tuesday ⌒ 310

300

To: susan@mail.com —⌇ 702

From: invoice@square.com —⌇ 704

Subject: jon@mail.com has sent you an invoice for $7! —⌇ 706 jon@mail.com has sent you a $7  —⌇ 708
invoice for Dinner on Friday.  Go here
to pay!

METHOD FOR TRANSFERRING MONEY USING EMAIL

TECHNICAL FIELD

This disclosure relates to payment processing using email.

BACKGROUND

A sender can transfer money to a recipient over the Internet. For example, the sender and recipient can use online banking services. To transfer money, the sender can provide bank information, e.g., account number and routing number, of the recipient to the sender's bank. The bank can process the transfer, e.g., through a wire transfer or the automated clearing house (ACH) financial network. Alternatively, the sender can use a third party money transfer service to transfer money. The third party transfer service can act as a middleman to the transfer. The sender transfers money to the third party transfer service, and the third party transfer service forwards the money to the recipient. To transfer money, the sender uses software, e.g., a web site or mobile application, developed by the third party money transfer service.

SUMMARY

Generally, a sender transfers money to a recipient using a physical check, online banking services, or third party transfer services, which can be cumbersome. Checks need to be physically deposited at a bank. Some online banking services require the recipient's bank account number and routing number before transferring the money. A third party transfer service requires both the sender and the receiver to have an account at the service and also requires the sender to use customized software developed by the third party, e.g., a web site or mobile application, to transfer money. For example, to transfer money to the recipient, the sender uses a browser to access a web site of the third party transfer service. The web site provides an interface to send money to a recipient, who also has an account with the third party transfer service.

As will be described in this specification, a system can transfer money from a sender to a recipient using standard email protocol. The sender can send an email message to the recipient and a service email address operated by the system, e.g., the service email address is carbon copied (CC'ed) on the email message. The system identifies respective card accounts for the sender and recipient and a payment amount from the email message. The system submits a request to transfer the payment amount from the sender's card account to the recipient's card account.

In one aspect, a method for receiving the email message from a sender device; identifying, using data processing apparatus of a payment service system, a sender email address, a service email address, and one or more recipient email addresses from the email message; identifying, for the sender email address, a sender financial account associated with the payment service system and, for each of the one or more recipient email addresses, a respective recipient financial account associated with the payment service system; identifying a payment amount from a subject or body of the email message; submitting a request to transfer, using the payment service system, the payment amount from the respective sender financial account to the respective recipient financial account.

Implementations can include one or more of the following. Sending, to the sender email address and each recipient email address, a confirmation email that the payment amount has been transferred. Each financial account is associated with one or more of the following: a physical debit card, a physical credit card, or a bank account. The payment amount is transferred over debit rails. Submitting a request to transfer the payment amount further comprises: dividing the payment amount into equal portions among each recipient email address; submitting a request to transfer, for each recipient email address, the respective portion to the respective recipient financial account. Submitting a request to transfer the payment amount comprises submitting a request to transfer the payment amount to each financial account associated with each recipient email address. Generating a first hash of the email message based on headers of the email message; receiving a second email message; generating a second hash of the second email message based on headers of the second email message; determining the first hash is equal to the second hash; and discarding the second email message. Storing a body of the email message as a description for the request to transfer the payment amount.

In another aspect, a method of transferring money from a sender to one or more recipients using an email message, comprising: receiving the email message from a sender device; identifying, using data processing apparatus of a payment service system, a sender email address, a service email address, and one or more recipient email addresses from the email message; determining at least one of the one or more recipient email addresses does not have a respective recipient financial account with the payment service system; generating, based on the service email address, a response email that includes a link to a customized resource that requests at least a financial account number and an expiration date, where the customized resource is associated with the respective recipient email address; and sending, to each of the at least one recipient email addresses, the response email.

Implementations can include one or more of the following. Receiving, through the customized resource for the respective recipient email address, the account number and the expiration date; and creating a user account at the payment service system for the respective recipient email address, where the user account is associated with the recipient financial account, and where the recipient financial account is based on the financial account number and the expiration date. Identifying a payment amount from a subject or body of the email message, and where the response email is used by a first recipient to redeem the payment amount, further comprising: receiving, through the resource, an indication to redeem the payment amount; identifying, for the sender email address, a sender financial account associated with the payment service system and a first recipient financial account associated with the payment service system; submitting a request to transfer the payment amount from the sender financial account to the first recipient's financial account. Identifying a payment amount from a subject or body of the email message, and where the response email is used by the recipient to invoice the payment amount, further comprising: receiving, through the resource, an indication to pay the payment amount; identifying, for the sender email address and each recipient email address, a respective financial account associated with the payment service system; submitting a request to transfer the payment amount from the financial account of the recipient email address to the financial account of the sender email address. Each financial account is associated with one or more of the following: a physical debit card, a physical credit card, or a bank account.

In another aspect, a method of transferring money from a sender to one or more recipients using an email message, comprising: receiving the email message from a sender device; identifying, using data processing apparatus of a payment service system, a sender email address, a service email address, and one or more recipient email addresses from the email message; identifying, for the sender email address, a respective sender financial account associated with the payment service system and, for each recipient email address, a respective recipient financial account associated with the payment service system; identifying an invoice amount from a subject or body of the email message; generating, for each recipient email address, an invoice email that includes a link to pay the invoice amount from a respective recipient financial account; and sending each invoice email to the respective recipient email addresses.

Implementations can include one or more of the following. Receiving data indicating a recipient of one of the recipient email addresses has engaged with the link; submitting a request to transfer, using the payment service system, the invoice amount from the respective recipient financial account to the respective sender financial account.

Advantages may include one or more of the following. A system can transfer money from a sender to a recipient in response to an email message. The system is intuitive because the sender can transfer money using an interface that users are already familiar with, i.e., a process of sending emails. The system's infrastructure utilizes already existing email server infrastructure, thereby minimizing cost to implement the system. If the recipient does not have a card account associated with the system, the system provides an interface for the recipient to enter financial account information, e.g., a card account number and an expiration date. After the recipient enters in the financial account information, the system allows the recipient to redeem a payment amount from the sender and, at the same time, also creates an account on the system for the recipient, thereby facilitating future money transfers for the recipient. The system also allows a sender to invoice a recipient for a payment amount.

BRIEF DESCRIPTION OF THE DRAWINGS

FIG. 7 is an illustration of an example user interface for invoicing the recipient over email.

Like reference numbers and designations in the various drawings indicate like elements.

DETAILED DESCRIPTION

Figure 1:
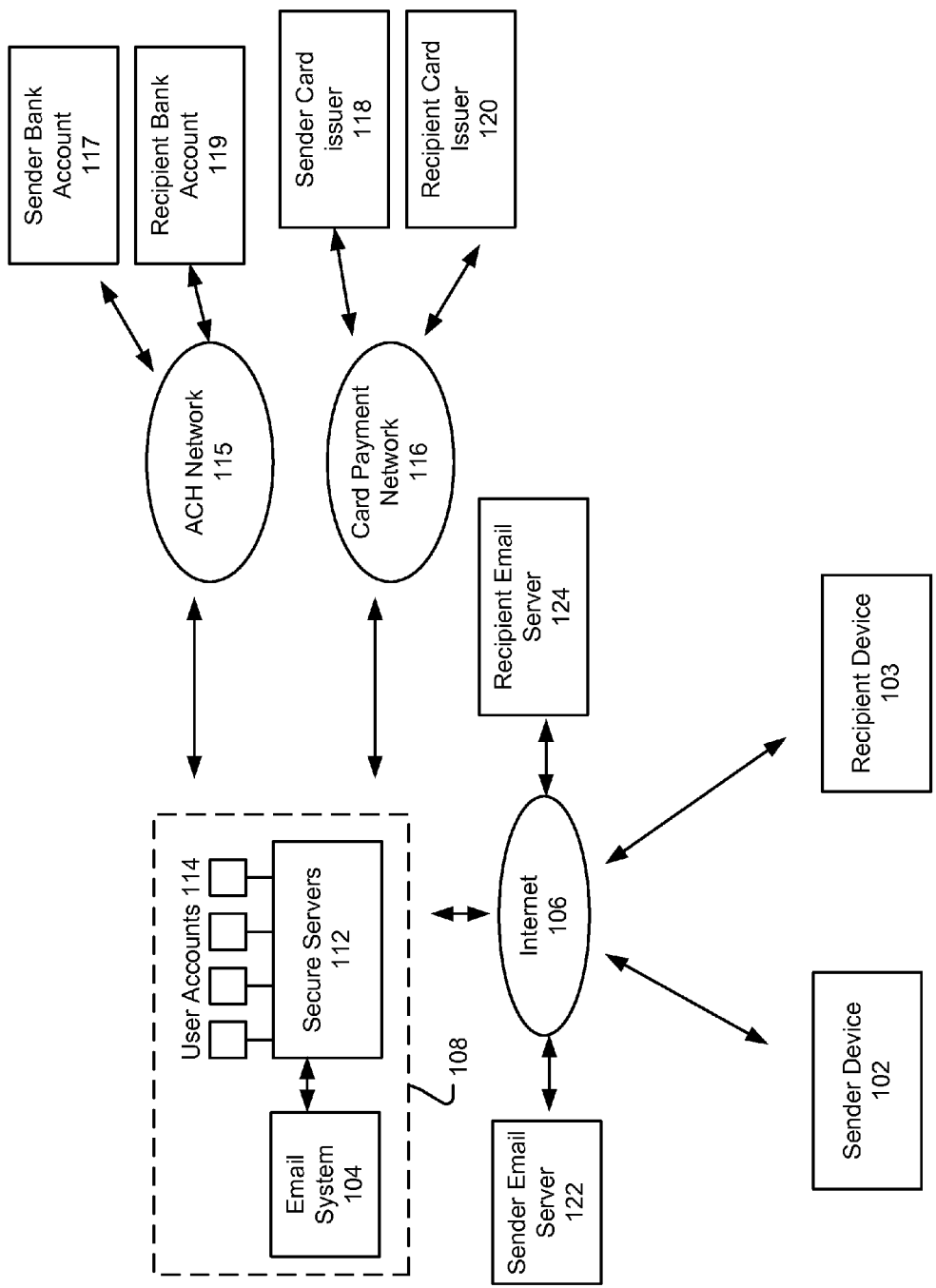
FIG. 1 is a schematic illustration of an example system architecture for transferring money over email.

FIG. 1 is a schematic illustration of an example system architecture 100 for transferring money over email. In particular, the system 100 can use email to have money transferred over bank account or debit card networks, which will be described further below. The overall system 100 includes a sender device 102, e.g., a desktop computer, connected to a network, e.g., the Internet 106. The sender device 102 is a computing device capable of running an email application. For example, the sender device 102 can be a smartphone, a tablet, a desktop computer, a laptop computer, or other data processing apparatus. The recipient device 103 is also a computing device connected to the Internet 106. The recipient device 103 can be a mobile device, e.g., a smartphone, tablet, or other portable data processing apparatus. A sender can use the sender device 102 to send, through a sender email server 122, an email to a recipient account to transfer money over email. The recipient account can receive the email through the recipient email server 124, which provides the email for display on the recipient device 103, e.g., using standard email protocols. Transferring money over email will be described further below in reference to FIGS. 2-7.

A payment processor operates a payment service system 108. The payment processor processes transfers conducted between the sender and recipient devices 102, 103. The sender device 102 can send an email to the recipient device 103 and to the payment service system 108, e.g., the payment service system 108 is carbon copied (CC'ed) on the email. The payment service system can, based on the email, transfer money between a sender card account to a recipient card account, and can communicate with the sender and recipient devices 102, 103 using an email system 104, e.g., a mail server operating under Simple Mail Transfer Protocol (SMTP). The payment service system 108 includes one or more servers 112, at least some of which can handle secure transactions (e.g., using a secure server), to process all emails with the sender and recipient devices 102,103. In general, servers 112 can store public merchant information such as the merchant's address or phone number. The servers 112 also handle secure information such as credit card numbers, bank accounts, user accounts 114, e.g., user identifying or profile information, debit card numbers, or other sensitive information.

Each user account 114 can be associated with one or more card accounts, e.g., debit or credit card accounts, of the user. A card account can be a financial account managed by a card issuer 118 and can be associated with a card number. In some implementations, the one or more card accounts are stored at the secure server 112. Generally, the card issuer 118 issues a physical payment card for each card account.

The payment service system 108 can communicate with a computer system 116 of a debit card payment network, e.g., STAR or PULSE. In some implementations, the payment service system can communicate with a computer system of a credit card payment network, e.g., Visa or MasterCard. The payment service system 108 can communicate with a computer system 116 over the same network 106 used to communicate with the sender device 102, or over a different network. The computer system 116 of the card payment network can communicate in turn with a computer system 118 of a sender card issuer, e.g., a bank, and a computer system 118 of a recipient card issuer. The sender card issuer 118 and the recipient card issuer 120 can transfer money, e.g., over a debit payment network, in response to a request to transfer money from the payment service system 108.

In some implementations, the payment service system 108 can communicate with a computer system 115 of the Automated Clearing House (ACH) network. The computer system 115 of the ACH network can communicate with a sender bank account 117 and a recipient bank account 119. The sender bank account 117 and the recipient bank account 119 can transfer money, e.g., using the ACH network, in response to a request to transfer money from the payment service system 108. There can also be computer systems of other entities, e.g., the card acquirer, between the payment service system 108 and the card issuers and between the payment service system 108 and the bank accounts.

Eventually, in order to receive funds from the transfer, the recipient will need to enter financial account information into the payment service system 108 sufficient to receive funds. For example, in the case of a bank account, the recipient can provide the bank account number and routing number. The recipient's financial account can also be associated with a debit card account, or another third party financial account. In addition, in some implementations, if the recipient has not entered the financial account information, the payment processor can hold the received funds until the financial account information is provided.

To transfer money between the sender and the recipient, the payment service system 108 can operate as a gateway or a middleman.

To operate as a gateway, the payment service system 108 can identify debit card accounts, e.g., stored at the secure servers 112, for both the sender and the receiver. The payment service system 108 can submit a request to an appropriate card issuer, e.g., to the sender's card issuer or to the receiver's card issuer, to transfer money. For example, the request can be sent over debit rails. That is, a debit card network can receive the request and can carry out the request to transfer money. The appropriate card issuer can receive and process the request by transferring money to the appropriate card account.

To operate as a middle man, the payment service system 108 can receive a payment amount by processing a card, e.g., a credit card or a debit card, of the sender and hold the payment amount. The payment service system 108 can push the payment amount, e.g., over debit rails, to a debit account of the recipient. Instead of holding the payment amount, the payment service system 108 can also forward the payment once the recipient links an account with the payment service system 108. Alternatively, the payment service system 108 can generate a transaction using ACH that debits an amount from the sender bank account and can credit the amount into a recipient bank account, e.g., using ACH, or onto a debit account, e.g., over debit rails, of the recipient.

Figure 2:
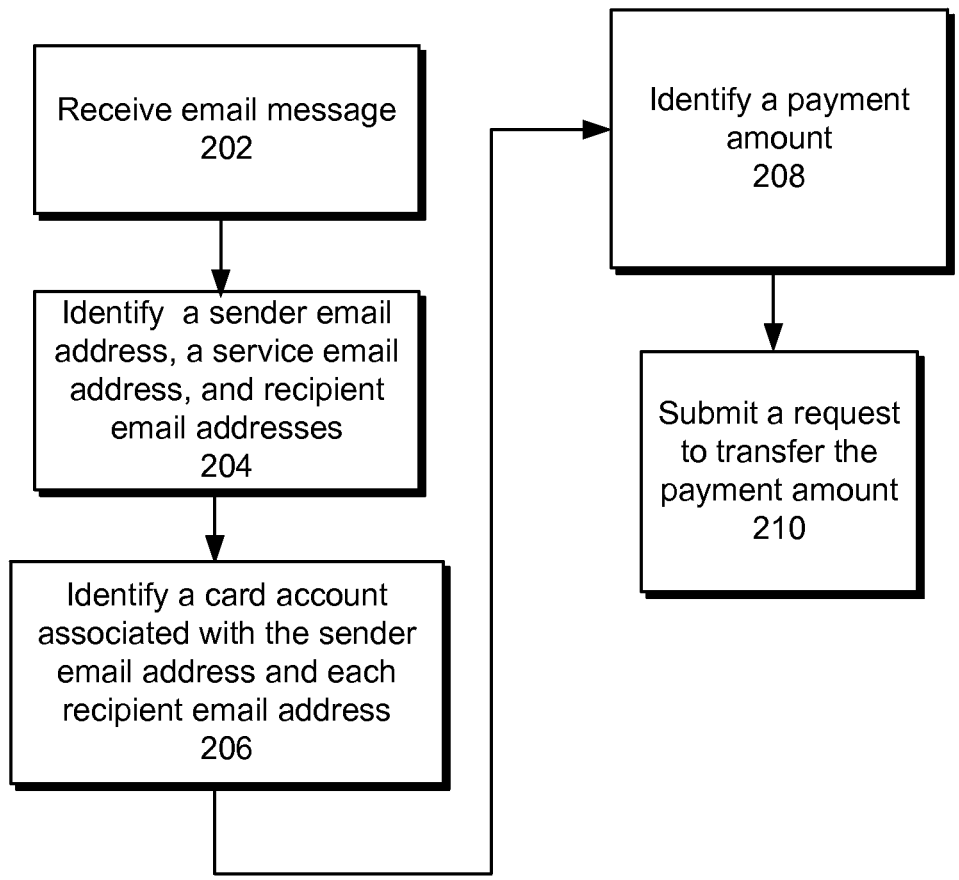
FIG. 2 is a flow chart of an example process of transferring money over email from a sender and a recipient where both have card accounts associated with a payment service system.

FIG. 2 is a flow chart of an example process of transferring money over email from a sender and one or more recipients, where the sender and each recipient have card accounts associated with a payment service system. For convenience, the process will be described with respect to a system, e.g., the payment service system 108 as described above in reference to FIG. 1.

The system receives an email message from a sender device (step 202). The email message can be forwarded from an email server of the system. The email message can have a syntax that includes, e.g., in the email message's headers, a sender email address, a service email address, a payment amount, and one or more recipient email addresses. The email message can also include an optional description. An example email message is discussed further below in reference to FIG. 3A.

The system can operate one or more service email addresses, e.g., pay@square.com or invoice@square.com. The system receives messages emailed to each of the one or more service email addresses and processes the messages based on the email address. For example, messages sent to pay@square.com can cause the system to transfer money from the sender email address to the recipient email address. On the other hand, messages sent to invoice@square.com can cause the system to send an invoice from the sender email address to the recipient email address. These will both be described in further detail below.

The system can authenticate received emails for integrity. For example, the system can use domain keys to verify message integrity and a domain of an email sender. The system can also prevent email spoofing and verify sender Internet Protocol (IP) addresses using sender policy framework (SPF). The system identifies the sender email address, a service email address, and each recipient email address from the email message (step 204). The system can parse a From field of the email message to identify the sender email address. The system can parse a To or CC field of the email message to identify each recipient email address. The system can also parse the To or CC field of the email message to identify the service email address. To identify the service email address, the system can compare each email address in the email message to a list of service email addresses stored at the system.

The system identifies, for the sender email address, a sender card account associated with the payment service system and, for each of the one or more recipient email addresses, a respective recipient card account associated with the payment service system (step 206). The card accounts can be identified from a secure database, e.g., the secure server 112, which associates email addresses to card accounts. Each card account can be associated with a physical debit card and with a user account. Although this describes using card accounts, the system can also use any financial account, e.g., bank accounts, wire transfers, or other funding mechanisms.

The system identifies a payment amount from the email message (step 208). The payment amount can be in the subject or body of the email message. In some implementations, the system identifies text in the email that includes a currency type, e.g., a '$', and designates the text as the payment amount.

Figure 3B:
FIGS. 3A-B are illustrations of an example user interfaces for transferring money over email between the sender and the recipient where both have card accounts associated with the payment service system.
Figure 3A:

In some implementations, the system ignores email messages that do not follow the syntax described in reference to FIG. 2 and FIG. 3A. For example, the system can discard email messages that have more than one service email address in the message, do not have the payment amount in the email message, or have more than one payment amount in the email message. The system can also discard if there is not a valid payment amount following a currency symbol, e.g., the payment amount is "$X" in the email. In these cases, the system can notify the sender and/or recipient email address that the system did not transfer money to the recipient email addresses.

In some implementations, the system identifies a description in the email message. For example, the email message can include a description, e.g., "Lunch on Tuesday," of the reason for a sender transferring the money. The description can be included in the body of the email message. The system can store the description of the transfer in the secure database.

The system optionally sends a confirmation email to the sender before submitting a request to transfer the payment amount. That is, the sender must engage a link in the confirmation email, e.g., the sender replies to the email with a "YES," to confirm the payment. Upon receiving an indication the sender engaged with the link, the system can submit a request to transfer the payment amount. In some other implementations, the system sends a confirmation email to the sender and also submits the request to transfer the payment amount. The sender can receive the confirmation email and can engage with the email, e.g., click on a link or reply to the email, to report an unauthorized payment.

The system submits a request, e.g., to an appropriate card issuer, to transfer the payment amount from an account of the sender email address to an account of each recipient email address (step 210). In some implementations, the system splits the payment amount among recipient card accounts. For example, the system can divide the payment amount into equal portions among the recipient email addresses and can submit a request to transfer, for each recipient email address, the respective portion to the respective card account of the respective recipient email address. In some other implementations, the system transfers the same payment amount to each recipient card account.

The system can receive a confirmation of the transfer from the card issuer. After receiving the confirmation, e.g., from a card issuer, that the payment amount(s) is transferred, the system can send a confirmation email to the sender email address and to each recipient email address indicating a successful transfer. The confirmation email can include the last 4 digits of the appropriate card number. In some implementations, the system sends the confirmation email by replying to the original email message, thereby allowing the original email message and the confirmation email to be displayed in an email client of the recipient.

In some implementations, if the card issuer rejects the transfer, the system can repeat the above mentioned steps 202-210 and request ACH information instead of card information from the recipient.

Under some circumstances, the email message is sent to the system more than once. For example, the sender's device can be a mobile device that has intermittent Internet connection. The system can generate a hash of a first email message based on headers of the email message. For example, the hash can be based on a message identifier, the recipient field, the sender field, a date, a time, and/or a subject line. If the system receives a second email message, the system generates a hash of the second email message based on headers of the second email message. The system can compare the hashes together, and if they are equal, the system can discard the second email.

FIG. 3A is an illustration of an example user interface 300 for transferring money from a sender to a recipient who both have card accounts associated with a payment service system. The sender can, e.g., using a device, use an email application or a web browser connected to an email server to compose an email. The email can include a recipient email address 302, a service email address 306, a sender email address 304, a subject 308, and a body 310. The sender can include a payment amount to be transferred in the subject 308, e.g., "$5," and a description of the money transfer, "e.g., Lunch on Tuesday," in the body 310 of the email. By sending an email in this format, the sender is requesting, using a payment service system that operates pay@square.com, a transfer of $5 from the sender's card account to a card account of susan@mail.com.

FIG. 3B is an illustration of an example user interface 312 for a transfer confirmation email received by the recipient email address. By way of illustration, after processing the email that is reference in FIG. 3A, the payment service system can send a confirmation email of the transfer to the recipient email address 302. The confirmation email can include a subject 314 that indicates how much a sender has transferred and a description 316 of the transfer.

Figure 4:
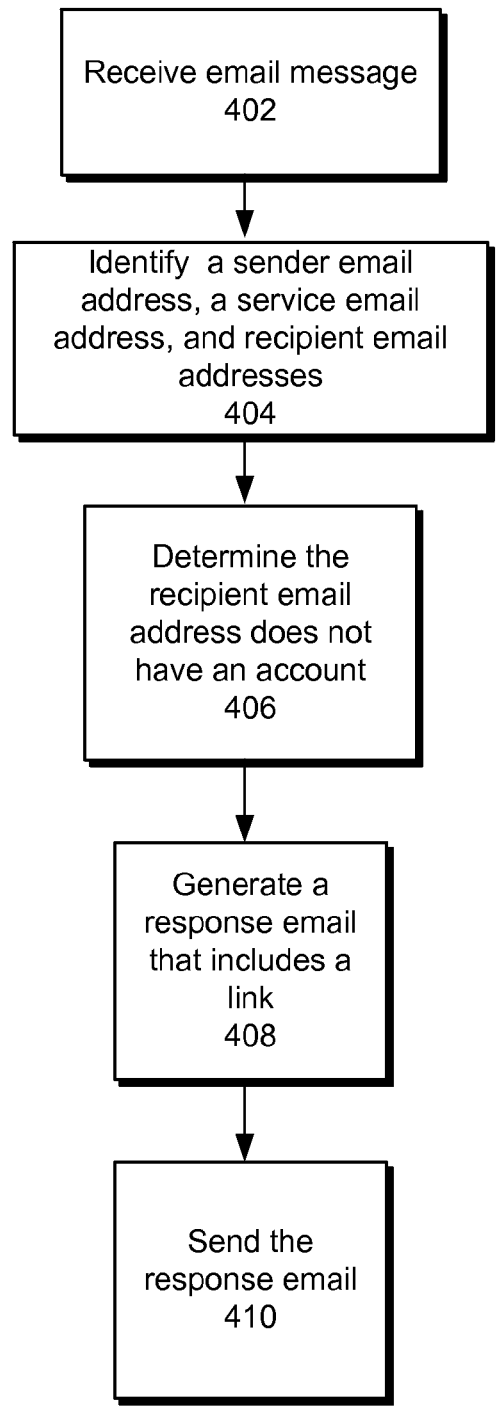
FIG. 4 is a flow chart of an example process of transferring money from a sender that has a card account associated with the payment service system and a recipient that does not have a card account associated with the payment service system.

FIG. 4 is a flow chart of an example process of transferring money from a sender that has a card account associated with the payment service system and one or more recipients that do not have a card account associated with the payment service system. For convenience, the process will be described with respect to system, e.g., the payment service system 108 as described above in reference to FIG. 1.

The system can operate as described above in reference to steps 202, 204, and 208 as described above in reference to FIG. 2. That is, the system receives an email message from a sender device (step 402). The system identifies a sender email address, a service email address, and recipient email addresses from the email message (step 404).

The system determines at least one of the recipient addresses do not have a card account associated with the system (step 406). In some implementations, the system determines whether the recipient email addresses exist in the user accounts database.

The system generates a response email to be sent to the recipient email addresses that do not have a card account with the system (step 408). The response email can be generated based on the service email address. For example, if the service email address is pay@square.com, the system can generate a payment redemption response email. Alternatively, if the service email address is invoice@square.com, the system can generate an invoice email. Examples of both response emails are discussed further below in reference to FIG. 5A.

If the system receives data indicating the recipient engaged with the response email, e.g., the recipient follows a link in the response email, the recipient can simultaneously redeem or invoice the payment amount and create an account with the system, which facilitates future money transfers and invoices to the recipient. The response email can include a link to a resource that requests at least a card account number and an expiration date. The resource can be customized to the recipient email address. This is discussed further below in reference to FIG. 5A.

The system sends the response email to each recipient email address that does not have a card account associated with the system (step 410).

In response to receiving data that a recipient provided financial information through the response email, the system can create a user account at the system for the recipient. The user account can be associated with the recipient email address, the recipient's card account, and the expiration date. In future money transfers to the recipient, the system no longer generates a response email due to the creation of the user account. Instead, in response to receiving an email message with an appropriate syntax, the system submits a request to transfer money as discussed above in reference to FIG. 2. After a user account is created, the recipient can also transfer money or send invoices to other recipients.

If the response email is a payment redemption email, the system can receive, through the resource, an indication to redeem the payment amount. That is, the recipient can follow a link, using a recipient device, in the resource to redeem the payment amount. The link, which is customized to the recipient, can be encoded with the sender email address and the recipient email address, or can be encoded with an identifier that refers to the sender and recipient email addresses. In some implementations, the link is displayed as a button display object. Based on the link, the system can identify the respective card account for the sender and the recipient. In response to the recipient engaging with the link, e.g., the recipient taps on the link, the system can submit a request to transfer the payment amount from the sender card account to the recipient card account.

Alternatively, if the response email is an invoice email, the system can receive, through the resource, an indication to pay the payment amount. That is, the recipient can follow a link in the resource to pay the payment amount. Similar to the customized link described above, the system can identify the respective card account for each email address. The system can submit a request to transfer the payment amount from the recipient card account address to the sender card account.

Figure 5B:
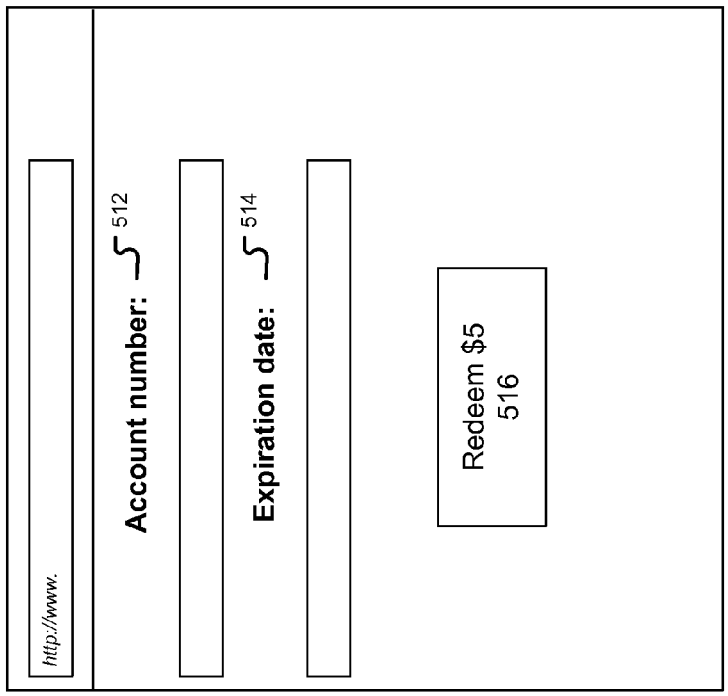
FIG. 5A-B are illustrations of example user interfaces for transferring money between the sender and the recipient, where the recipient does not have a card account associated with the payment service system.
Figure 5A:
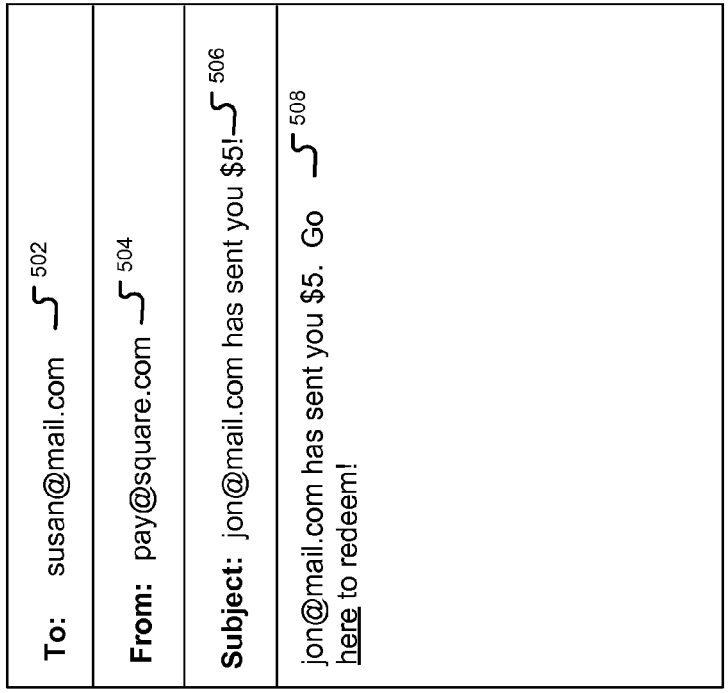

FIG. 5A is an illustration of a user interface 500 of a payment redemption email message sent from a payment service system. The email message can be sent from a service email address 504 to a recipient email address 502. The subject 506 can include a description of a sender and a sent payment amount. The description 508 of the email can include a link to a resource, e.g., a customized link described above in reference to FIG. 4, for the recipient to redeem the payment amount.

FIG. 5B is an illustration of an example user interface 510 of a resource linked from the payment redemption email in reference to FIG. 5A. The resource can include text fields for a card account number 512, e.g., a debit card number, and an expiration date 514 of the card. The resource can display a button 516 that links to the payment service system. The button can be encoded with an identifier of the recipient and the sender. In response to the recipient engaging the button 516, the payment service system can create an account for the recipient and transfer the payment amount, as described above in reference to FIG. 4.

In some implementations, the resource can request, e.g., display text fields for, additional information from the user. For example, the resource can request a recipient's name, phone number, social security number, or birthday. In some implementations, the payment service system determines the recipient's name from email headers.

Similar to generating the payment redemption email, the payment service system can generate an invoice email. For example, a generated invoice email can have the subject 506 read "jon@mail.com has sent you an invoice for $5." The service email address 504 can be invoice@square.com. The description 508 can read "jon@mail.com has sent you an invoice for $5. Go here to pay!" The customized resource, likewise, can display a button 516 that reads "Pay $5." Upon receiving an indication that a recipient engages with the button 516, the payment service system can create an account for the recipient and invoice the payment amount, as described above in reference to FIG. 4.

Figure 6:
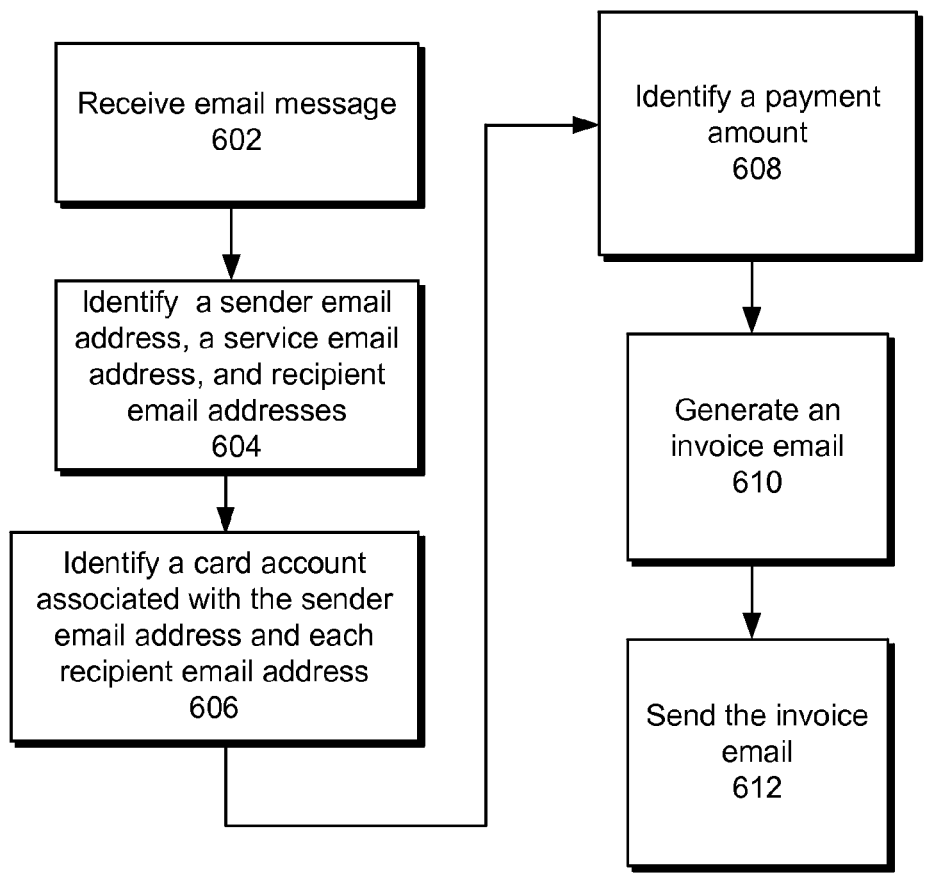
FIG. 6 is a flow chart of an example process of a sender invoicing a recipient for a payment amount.

FIG. 6 is a flow chart of an example process of a sender invoicing a recipient for a payment amount. For convenience, the process will be described with respect to a system, e.g., the payment service system as described above in reference to FIG. 1.

The system can operate as described above in reference to steps 202, 204, 206, and 208 as described above in reference to FIG. 2. That is, the system receives an email message from a sender device (step 602). The system identifies a sender email address, a service email address, and recipient email addresses from the email message (step 604). The system identifies a card account associated with the sender email address and each recipient email address (step 606). As noted above, even though this describes using card accounts, the system can also use any financial account, e.g., bank accounts, wire transfers, or other funding mechanisms. The system identifies a payment amount from the email message (step 608).

Because the sender and each recipient have respective card accounts associated with the system, the system can generate an invoice email that includes a link to pay the payment amount from a respective account of each recipient (step 610). The invoice email is described further below in reference to FIG. 7.

The system can send each invoice email to the respective recipient email addresses (step 612).

FIG. 7 is an illustration of an example user interface for invoicing the recipient over email. The email can be addressed to a recipient email address 702 and sent from a service email address 704. The subject 706 can include a sender email address and an invoice amount. The description 708 can include a description of the invoice sent by the sender email address. Upon engaging with the link, the recipient can use the recipient device to send an indication to pay the invoice amount. The payment service system can receive data indicating the recipient engaged with the link. The payment service system can then submit a request to transfer the invoice amount from the account of the recipient to the account of the sender.

Figure 8:
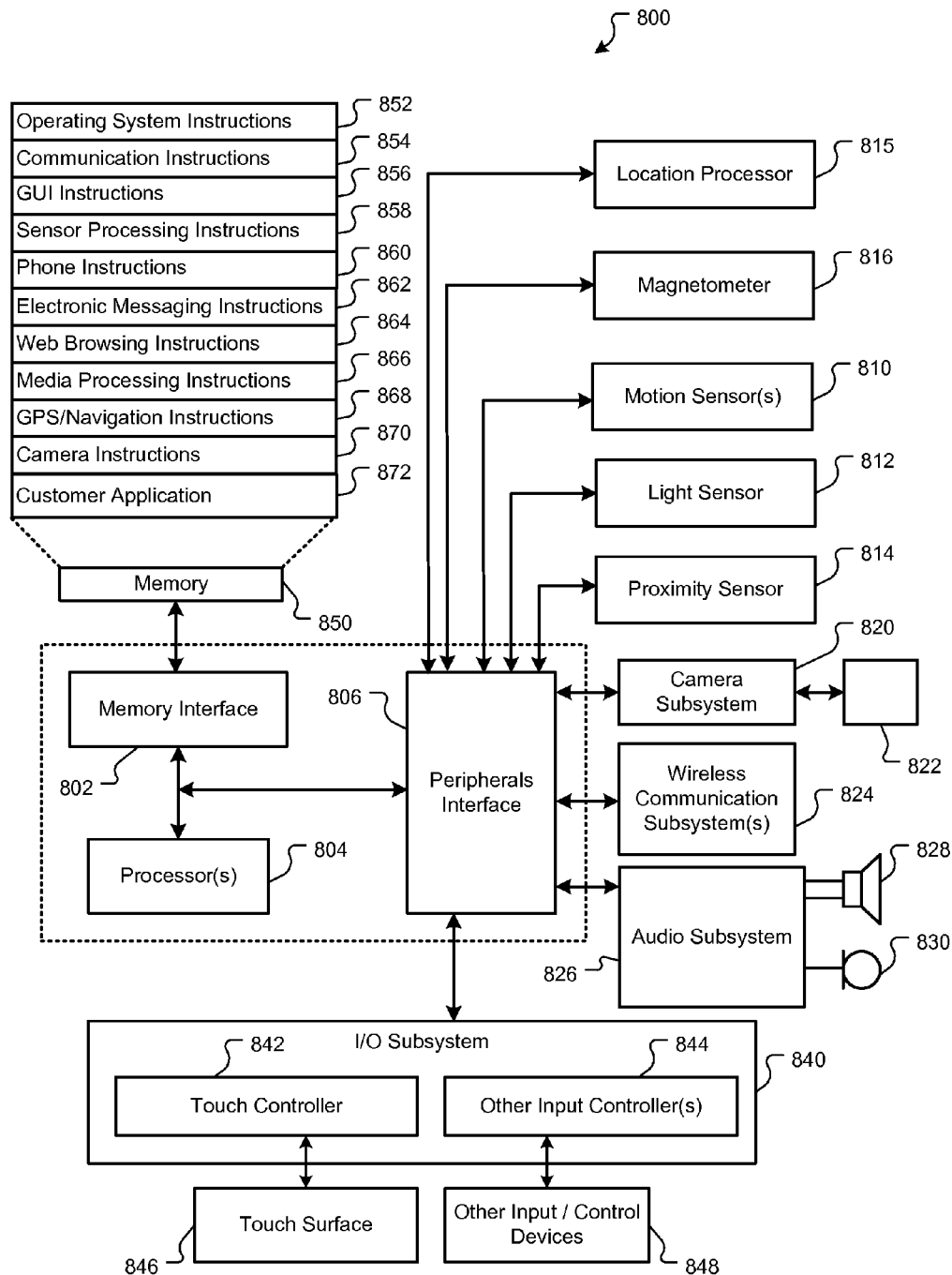
FIG. 8 is a block diagram of an exemplary architecture of a mobile device capable of emailing a recipient to transfer money.

FIG. 8 is a block diagram of an exemplary architecture of a mobile device capable of emailing a recipient to transfer money. At least one or more parts in the architecture 800 can be implemented in any device for generating the features described in reference to FIGS. 1-7, including but not limited to portable or desktop computers, servers, smart phones and electronic tablets, television systems, game consoles, kiosks and the like. Architecture 800 can include memory interface 802, data processor(s), image processor(s) or central processing unit(s) 804, and peripherals interface 806. Memory interface 802, processor(s) 804 or peripherals interface 806 can be separate components or can be integrated in one or more integrated circuits. The various components can be coupled by one or more communication buses or signal lines.

Sensors, devices, and subsystems can be coupled to peripherals interface 806 to facilitate multiple functionalities. For example, motion sensor 810, light sensor 812, and proximity sensor 814 can be coupled to peripherals interface 806 to facilitate orientation, lighting, and proximity functions of the device. For example, in some implementations, light sensor 812 can be utilized to facilitate adjusting the brightness of touch surface 846. In some implementations, motion sensor 810 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 806, such as a temperature sensor, a biometric sensor, or other sensing device, to facilitate related functionalities.

Location processor 815 (e.g., GPS receiver) can be connected to peripherals interface 806 to provide geo-positioning. Electronic magnetometer 816 (e.g., an integrated circuit chip) can also be connected to peripherals interface 806 to provide data that can be used to determine the direction of magnetic North. Thus, electronic magnetometer 816 can be used as an electronic compass.

Camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 824. Communication subsystem(s) 824 can include one or more wireless communication subsystems. Wireless communication subsystems 824 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 824 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 824 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 826 can be coupled to a speaker 828 and one or more microphones 830 to facilitate voice-enabled functions, such as voice recognition, voice replication, digital recording, and telephony functions.

I/O subsystem 840 can include touch controller 842 and/or other input controller(s) 844. Touch controller 842 can be coupled to a touch surface 846. Touch surface 846 and touch controller 842 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 846. In one implementation, touch surface 846 can display virtual or soft buttons and a virtual keyboard, which can be used as an input/output device by the user.

Other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of speaker 828 and/or microphone 830.

In some implementations, device 800 can present recorded audio and/or video files, such as MP3, AAC, and MPEG files. In some implementations, device 800 can include the functionality of an MP3 player and may include a pin connector for tethering to other devices. Other input/output and control devices can be used.

Memory interface 802 can be coupled to memory 850. Memory 850 can include high-speed random access memory or non-volatile memory, such as one or more magnetic disk storage devices, one or more optical storage devices, or flash memory (e.g., NAND, NOR). Memory 850 can store operating system 852, such as Darwin, RTXC, LINUX, UNIX, OS X, WINDOWS, or an embedded operating system such as VxWorks. Operating system 852 may include instructions for handling basic system services and for performing hardware dependent tasks. In some implementations, operating system 852 can include a kernel (e.g., UNIX kernel).

Memory 850 may also store communication instructions 854 to facilitate communicating with one or more additional devices, one or more computers or servers. Communication instructions 854 can also be used to select an operational mode or communication medium for use by the device, based on a geographic location (obtained by the GPS/Navigation instructions 868) of the device. Memory 850 may include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions and display GUIs; media processing instructions 866 to facilitate media processing-related processes and functions; GPS/Navigation instructions 868 to facilitate GPS and navigation-related processes; camera instructions 870 to facilitate camera-related processes and functions; and instructions 872 for emailing a recipient to transfer money. The memory 850 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 850 can include additional instructions or fewer instructions. Furthermore, various functions of the mobile device may be implemented in hardware and/or in software, including in one or more signal processing and/or application specific integrated circuits.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of transferring money from a user to a recipient using an email message, comprising:
   receiving, by a payment service system, the email message originating at a sender device associated with the user, wherein the email message is transmitted to an email server by the sender device and forwarded by the email server to the payment service system using a payment service email address associated with the payment service system, wherein the email message is addressed to a recipient email address and has a header that specifies the payment service email address associated with the payment service system, and wherein the email message includes, within a body or a subject line of the email message, a payment amount to be transferred to a recipient associated with the recipient email address;
   analyzing, by the payment service system, the received email message to identify a sender email address associated with the user and the recipient email address;
   identifying, by the payment service system, a sender financial account associated with the identified sender email address of the email message, wherein the sender financial account is preregistered with the payment service system;
   identifying, by the payment service system, a recipient financial account associated with the identified recipient email address of the email message;
   analyzing, by the payment service system, the subject line or the body of the email message to determine the payment amount to the transferred to the recipient associated with the recipient email address; and
   initiating, by the payment service system, a transfer of the determined payment amount from the respective sender financial account to the recipient financial account.

2. The method of claim 1, further comprising sending, to the sender email address and the recipient email address, a confirmation email that the payment amount has been transferred from the sender financial account to the recipient financial account.

3. The method of claim 1, wherein the email message is composed by the user in an email application of the email server.

4. The method of claim 1, wherein the payment service email address is specified on a carbon copy line of the email message.

5. The method of claim 1, wherein analyzing, by the payment service system, the subject line or the body of the email message to determine the payment amount to the transferred to the recipient associated with the recipient email address comprises:
   identifying a plurality of recipient email addresses of the email message and a corresponding plurality of recipient financial accounts;
   identifying a user-specified amount from the subject line or the body of the email message;
   splitting the user-specified amount into a plurality of portions among each recipient email address of the plurality of recipient email addresses of the email message; and
   initiating a transfer, for each recipient email address of the plurality of recipient email addresses, a particular portion of the plurality of portions to a respective recipient financial account of the plurality of recipient financial accounts.

6. The method of claim 1, further comprising transferring the determined payment amount to the recipient financial account associated with the recipient email address.

7. The method of claim 1, further comprising:
   generating a first hash of the email message based on headers of the email message;
   receiving a second email message from the email server, wherein the second email message includes the sender email address;
   generating a second hash of the second email message based on headers of the second email message;
   determining the first hash is equal to the second hash; and
   in response to determining that the first hash is equal to the second hash, analyzing the email message instead of the second email message.

8. The method of claim 1, further comprising:
   sending a confirmation email to the sender email address, wherein the confirmation email includes a confirmation link; and
   receiving, by the payment service system, an indication of user engagement with the confirmation link.

9. A method of transferring money from a recipient to a user using an email message, comprising:
   receiving, by a payment service system, the email message sent by an email server, wherein the email message originated from input by the user at a sender device associated with the user, wherein the email message is addressed to a recipient email address, wherein the email message includes a payment service indicator that triggers the email server to forward at least a portion of the email message to the payment service system, wherein the payment service indicator is included in the email message prior to the email being sent to the payment service system by the email server, wherein the email message includes, within a subject or a body of the email message, a payment amount to be transferred to a sender account associated with the user;
   identifying, from the received email message by the payment service system, a sender email address associated with the user and a recipient email address;
   identifying, by the payment service system, a sender financial account of the payment service system associated with the sender email address of the email message;
   identifying, by the payment service system, a recipient financial account of the payment service system associated with the recipient email address of the email message;
   analyzing, by the payment service system, the subject or the body of the email message to determine the an invoice amount indicated in the email message by the user;
   generating an invoice email message that includes a link to initiate a transfer of the invoice amount from the recipient financial account to the sender financial account; and
   sending the invoice email message to the recipient email address.

10. The method of claim 9, further comprising:
    receiving, by the payment service system, an indication of user engagement with the link to initiate the transfer of the invoice amount indicated in the email message;
    initiating a transfer of the determined invoice amount from the recipient financial account to the sender financial account.

11. A payment service system comprising:
one or more computers and one or more storage devices storing instructions that are operable, when executed by the one or more computers, to cause the one or more computers to perform operations comprising:
receiving an email message sent by an email server, wherein the email message originated from input by a user at a sender device associated with the user, wherein the email message is addressed to a recipient email address, wherein the email message includes a payment service indicator that triggers the email server to forward at least a portion of the email message to the payment service system, wherein the payment service indicator is included in the email message prior to the email being sent to the payment service system by the email server, wherein the email message includes, within a subject or a body of the email message, a payment amount to be transferred to a recipient account associated with the recipient email address;
identifying, from the received email message, a sender email address associated with the user and the recipient email address;
identifying a sender financial account of the payment service system associated with the sender email address of the email message;
identifying a recipient financial account of the payment service system associated with the recipient email address of the email message;
analyzing the subject or the body of the email message to determine the payment amount indicated in the email message by the user; and
initiating a transfer of the determined payment amount from the sender financial account to the recipient financial account.

12. The system of claim 11, wherein the payment service indicator is a payment service email address associated with the payment service system.

13. The system of claim 12, wherein the payment service email address is specified on a carbon copy line of the email message.

14. The system of claim 11, wherein identifying a sender email address associated with the user comprises parsing, by the payment service system, a From field of a header of the received email message to identify the sender email address.

15. The system of claim 11, wherein identifying a recipient email address associated with the user comprises parsing, by the payment service system, a To field of a header of the received email message to identify the recipient email address.

16. The system of claim 11, wherein the email message is composed by the user in an email application of the email server.

17. A computer-implemented method of transferring money from an account of a user to an account of a recipient using an email message, comprising:
receiving, by a payment service system, the email message sent by an email server, wherein the email message originated from input by the user at a sender device associated with the user, wherein the email message is addressed to a recipient email address, wherein the email message includes a payment service indicator that triggers the email server to forward at least a portion of the email message to the payment service system, wherein the payment service indicator is included in the email message prior to the email being sent to the payment service system by the email server, wherein the email message includes, within a subject or a body of the email message, a payment amount to be transferred to a recipient account associated with the recipient email address;
identifying, from the received email message by the payment service system, a sender email address associated with the user and the recipient email address;
identifying, by the payment service system, a sender financial account of the payment service system associated with the sender email address of the email message;
identifying, by the payment service system, a recipient financial account of the payment service system associated with the recipient email address of the email message;
analyzing, by the payment service system, the subject or the body of the email message to determine the payment amount indicated in the email message by the user;
initiating, by the payment service system, a transfer of the determined payment amount from the sender financial account to the recipient financial account.

18. The method of claim 17, wherein the payment service indicator is a payment service email address associated with the payment service system.

19. The method of claim 18, wherein the payment service email address is specified on a carbon copy line of the email message.

20. The method of claim 17, wherein identifying a sender email address associated with the user comprises parsing, by the payment service system, a From field of a header of the received email message to identify the sender email address.

21. The method of claim 17, wherein identifying a recipient email address associated with the user comprises parsing, by the payment service system, a To field of a header of the received email message to identify the recipient email address.

22. The method of claim 17, wherein the email message is composed by the user in an email application of the email server.

* * * * *

UNITED STATES PATENT AND TRADEMARK OFFICE
CERTIFICATE OF CORRECTION

PATENT NO. : 8,606,703 B1
APPLICATION NO. : 13/839623
DATED : December 10, 2013
INVENTOR(S) : Jack Dorsey et al.

Page 1 of 1

It is certified that error appears in the above-identified patent and that said Letters Patent is hereby corrected as shown below:

Title Page, Item (56), Column 2, Line 12 in the listing of Other Publications, delete "platform>." and insert -- platform/>. --.

Title Page, Item (56), Column 2, Line 15 in the listing of Other Publications, delete "chirpify.com>." and insert -- chirpify.com/>. --.

In the Claims

In Claim 1, column 15, line 37, delete "to the transferred" and insert -- to be transferred --.

In Claim 5, column 15, line 55-56, delete "to the transferred" and insert -- to be transferred --.

In Claim 9, column 16, line 53, after "the" delete "an".

In Claim 17, column 18, line 30, after "user;" insert -- and --.

Signed and Sealed this
Eighteenth Day of March, 2014

Michelle K. Lee
*Deputy Director of the United States Patent and Trademark Office*